United States Patent [19]

DiMartino, Sr.

[11] Patent Number: 4,952,219
[45] Date of Patent: Aug. 28, 1990

[54] MEMBRANE DRYING OF GAS FEEDS TO LOW TEMPERATURE UNITS

[75] Inventor: Stephen P. DiMartino, Sr., Topton, Pa.

[73] Assignee: Air Products and Chemicals, Inc., Allentown, Pa.

[21] Appl. No.: 415,017

[22] Filed: Sep. 29, 1989

[51] Int. Cl.⁵ .............................................. B01D 53/22
[52] U.S. Cl. .......................................... 55/16; 55/31; 55/62; 55/75; 62/18; 62/27
[58] Field of Search ............... 55/16, 30, 31, 62, 75, 55/158, 389; 62/11, 18–20, 23, 27

[56] References Cited

U.S. PATENT DOCUMENTS

| | | | |
|---|---|---|---|
| 4,230,463 | 10/1980 | Henis et al. | 55/16 |
| 4,560,394 | 12/1985 | McDonald et al. | 55/158 X |
| 4,595,405 | 6/1986 | Agrawal et al. | 62/18 |
| 4,645,516 | 2/1987 | Doshi | 55/62 X |
| 4,654,047 | 3/1987 | Hopkins et al. | 62/23 |
| 4,654,063 | 3/1987 | Auvil et al. | 55/158 X |
| 4,701,187 | 10/1987 | Choe et al. | 55/62 X |
| 4,717,407 | 1/1988 | Choe et al. | 55/158 X |
| 4,718,921 | 1/1988 | Makino et al. | 55/16 |
| 4,732,583 | 3/1988 | DeLong et al. | 55/158 X |
| 4,759,776 | 7/1988 | Langsam et al. | 55/16 |
| 4,761,167 | 8/1988 | Nicholas et al. | 62/20 X |
| 4,783,201 | 11/1988 | Rice et al. | 55/16 |
| 4,783,203 | 11/1988 | Doshi | 55/62 X |
| 4,859,215 | 8/1989 | Langsam et al. | 55/16 |
| 4,861,351 | 8/1989 | Nicholas et al. | 55/68 X |
| 4,863,492 | 9/1989 | Doshi et al. | 55/16 |

FOREIGN PATENT DOCUMENTS

| | | | |
|---|---|---|---|
| 62-042723 | 2/1987 | Japan | 55/16 |
| 01-143624 | 6/1989 | Japan | 55/16 |
| 01-143625 | 6/1989 | Japan | 55/16 |
| 01-143626 | 6/1989 | Japan | 55/16 |
| 01-176425 | 7/1989 | Japan | 55/16 |

*Primary Examiner*—Robert Spitzer
*Attorney, Agent, or Firm*—Mark L. Rodgers; William F. Marsh; James C. Simmons

[57] ABSTRACT

A process is provided for the low temperature separation of a high purity gas product at lower power requirements by permeating a feed gas stream through a membrane having a water-to-gas-product selectivity of at least about 100, separating water from the gas stream, feeding the partially dried gas stream through a molecular sieve to remove residual water, and supplying the dried gas stream to a low temperature separation unit to separate gas product(s) from the gas stream.

13 Claims, 2 Drawing Sheets 4,952,219

MEMBRANE DRYING OF GAS FEEDS TO LOW TEMPERATURE UNITS

FIELD OF THE INVENTION

This invention relates to a process for drying gases using a membrane to partially dehydrate a gas stream fed to a cryogenic or low temperature processing unit (LTU) for separating gases. In one embodiment, dry waste gas from the LTU is used as a sweep gas for the membrane.

BACKGROUND OF THE INVENTION

The separation of gas streams, most notably air, into constituent components such as oxygen, argon and nitrogen has been practiced for many years utilizing energy intensive processes for the recovery of various purities and volumes of gas product. Chemical and/or physical adsorption of individual gas components, cryogenic distillation of various gas components, and gas permeation through membrane media have all been practiced to recover components of gas streams and particularly to recover oxygen and/or nitrogen from air. These processes generally suffer from high utility costs and lack of continuous or convenient regeneration or operation.

For example, in conventional cryogenic air separation procedures, the single largest variable expense is the cost of power. In many cases, a reduction of as low as 0.5 to 1% in power consumption can offer significant economic advantage. Consequently, there is great interest in reducing specific power, that is, the power consumed per unit of product produced Most high volume plants for producing nitrogen by cryogenic air separation techniques currently use a molecular sieve to remove water and trace carbon dioxide from air prior to cryogenic distillation in a cold box. In many cases, the molecular sieve drying step is preceded by mechanical refrigeration. Such pretreatment reduces the load on the molecular sieve drier by lowering its operating temperature and condensing away much of the water. In most cases, adsorbents such as molecular sieves exhibit higher capacities as their operating temperatures are decreased.

While the power consumption of the prerefrigeration unit is small compared to that of the overall plant, a savings ranging from about 1 to 2% of the total power draw could be realized if the refrigeration pretreatment step could be eliminated. Further, elimination of such pretreatment would obviate the need for a piece of rotating equipment, reduce consumption of possibly environmentally objectionable refrigerants, and improve the reliability of plant operation.

Unfortunately, elimination of the refrigeration pretreatment is not feasible. The resultant higher load on the molecular sieve driers would require a dramatic increase in their size and, more importantly, would require such an increase in the amount of regeneration gas required for the molecular sieve unit that any energy savings would be more than eliminated by increased regeneration energy costs, particularly in warmer climates.

Nevertheless, some effort has been directed at eliminating the refrigeration pretreatment step in lower recovery plants where the waste stream from the cold box is used to cool water which is in turn used to cool the feed air prior to the drier. In another approach, low cost refrigeration systems such as ammonia refrigeration or heat pumps have been suggested. In spite of such efforts, where high efficiency separation is required to produce high quality product at high recovery, there is no substitute for the refrigeration pretreatment step in low temperature gas separation systems.

Rice, et al., U.S. Pat. No. 4,783,201, disclose a process and apparatus for dehydrating gases. Gas mixtures, such as air, are contacted with an asymmetric membrane having transport selectivity for water vapor vs. the feed gas of at least about 1000, to permeate a majority of the water contained in the feed gas.

SUMMARY OF THE INVENTION

It has now been found that a high quality gas product can be produced at high efficiency with high recovery and lower power requirements by a process which comprises permeating a feed gas stream through a membrane having a water-to-gas product selectivity of at least about 100, which separates water from the gas stream, feeding the partially dried gas stream through a molecular sieve to remove any residual water, and supplying the dried gas stream to a cryogenic or low temperature gas separation unit, which separates the desired gas product(s) from the feed gas stream.

Generally, in a process for producing high purity nitrogen by the low temperature separation of a feed air stream in which the feed air is dried prior to introducing it into a low temperature separation unit to separate nitrogen from the feed air, the improvement of the invention comprises passing the feed air over a membrane selective to the permeation of water over nitrogen, feeding the partially dried gas stream through a molecular sieve to remove the residual water, supplying the gas stream to a low temperature separation unit, and separating nitrogen from the gas stream.

The dry waste or exhaust gas from the low temperature separation unit can also be used as a sweep stream for the membrane as well as for molecular sieve regeneration. When used both as a membrane sweep gas and molecular sieve regeneration stream, the waste or exhaust stream is compressed and separated into membrane and molecular sieve sweep streams. The membrane sweep stream is fed directly to the membrane while the molecular sieve regeneration stream is fed to the molecular sieve drier to heat and cool the beds.

DETAILED DESCRIPTION OF THE INVENTION

The invention provides a method for predrying gases using a membrane before the gas is introduced to a low temperature processing unit for separation. This eliminates the freon refrigeration unit usually employed before the molecular sieve dryer, thereby reducing environmental hazard and potentially permitting a reduction of dryer size. In a preferred embodiment, dry waste gas from the low temperature processing unit is used as a sweep gas for the membrane and a regenerating gas for the molecular sieve predryer. This embodiment minimizes loss of feed gas and prevents condensation on the downstream or permeate side of the membrane It also tends to reduce the loss of valuable constituents through the membrane due to their presence on the permeate or downstream side of the membrane. By using appropriate pressures, a desired component could be made to diffuse counter-current to the water being eliminated, thus increasing system recovery. More importantly, the dry gas from a low temperature processing unit can be used to increase the driving force for water elimination, making it possible to operate with smaller membranes at smaller pressure differences.

The invention will be described in detail herein with reference to the accompanying drawings in which like numerals refer to like elements. It is to be understood that the Figures merely illustrate preferred embodiments and that other conditions, configurations, elements, and variations without limitation also fall within the scope of the invention.

Figure 1:
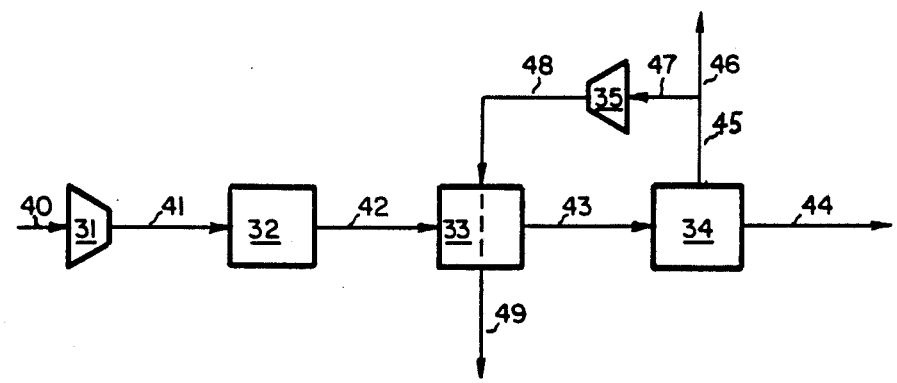
FIG. 1 schematically illustrates an air separation unit which uses a refrigeration pre-dryer.

The membrane predryer of the invention can be used with any suitable low temperature processing unit for separating a gas stream. For example, FIG. 1 shows a typical low temperature gas separation cycle which uses a refrigeration predryer. The FIG. 1 base unit is a 40 MMSCFD nitrogen generator low temperature processing unit 34.

In FIG. 1, feed air 40 is compressed in feed air compressor 31 to about 140 psia. Compressed feed air 41 is first dried by feeding it to refrigeration unit 32 where its temperature is reduced to about 40° F., thus reducing its water content by condensation. Refrigerated air 42 thus produced is then fed to molecular sieve dryer 33 where it is further dried. Dried air 43 is then fed to a low temperature separation unit or coldbox 34 which contains a double column air separation process. The low temperature separation unit 34 of FIG. 1 is a cryogenic nitrogen generator. It recovers about 71 moles of gaseous nitrogen per 100 moles of air fed to the main air separation column with about 25.5 moles of the nitrogen recovered at high pressure. Coldbox refrigeration is provided by expansion of the low pressure column air feed. All nitrogen product 44 is compressed to about 5000 psia. A portion (about 65%) of coldbox waste 45 is eliminated as process waste stream 46 while another portion (about 35%) 47 is compressed to about 17 psia, by waste blower 35 and fed to the molecular sieve drier 33 as compressed dryer regeneration stream 48 to regenerate molecular sieve dryer 33 after which it is eliminated via molecular sieve regeneration vent stream 49.

Figure 2:
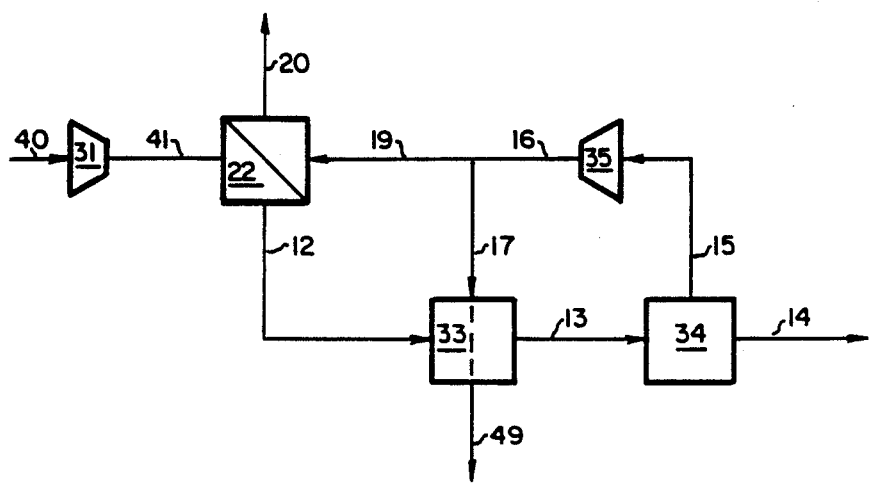
FIG. 2 schematically illustrates an air separation unit of the invention which uses a membrane pre-dryer.

In a preferred embodiment of the invention shown in FIG. 2, wet gas 40 is fed through feed air compressor 31 to the high pressure side of membrane 22. Because the water in the gas stream is more permeable than the other components, it permeates or passes through the membrane into low pressure permeate stream 20. Some of the carbon dioxide in the feed gas which is also more permeable than oxygen or nitrogen but less permeable than water also passes through the membrane The partially dried air or residual stream 12 from membrane 22 is fed to a standard molecular sieve unit 33 where remaining water and carbon dioxide are removed. Dried air 13 is then fed to low temperature separation unit or coldbox 34. This low temperature air separation unit 34 separates the gas stream into high purity nitrogen 14 and a waste or exhaust stream 15 which contains all the other constituents of the feed air.

In a further improvement, cold box waste or exhaust stream 15, which generally contains from about 60 to 70% oxygen and is at atmospheric pressure, is used to provide a sweep stream for membrane 22 and to regenerate molecular sieve 33. In this embodiment, the waste stream is compressed via blower 35 to compressed waste stream 16 at a pressure of from 16–25 psia, preferably about 17–19 psia. Compressed waste stream 16 is separated into sweep stream 19 and drier regeneration stream 17. Drier regeneration stream 17 is fed to molecular sieve predryer 33 to heat and cool the beds as in FIG. 1. Membrane sweep stream 19 is fed directly to the permeate side of membrane 22. Membrane sweep stream 19 prevents water from condensing on the downstream side of the membrane by reducing its partial pressure. Since permeation is a partial pressure driven process, reducing the partial pressure of water on the downstream side of the membrane also increases the driving force on feed gas 41 and reduces the membrane area required for separation. It can also offer a potential reduction in drier size or lengthen the drier cycle for a fixed drier size.

Sweep gas 19 also increases the partial pressure of the other feed gas components to reduce the loss of those components to the permeate stream. Water and carbon dioxide permeate through the membrane into the sweep drying the gas. Some nitrogen and oxygen will co-permeate, but such recovery loss is reduced by the presence of nitrogen and oxygen in the sweep.

Any suitable configuration can be used for membrane predryer 22 including hollow fiber, spiral wound, flat sheet and the like. Membranes of any suitable polymer which provide a water-to-nitrogen selectivity of at least about 100 can be used as membrane predryer 22. Some such suitable membranes include those prepared of polytrimethylsilylpropyne polymers as described in U.S. Pat. No. 4,657,564 which is hereby incorporated herein by reference and their polytrimethylgermylpropyne counterparts, multicomponent gas membranes as disclosed in U.S. Pat. No. 4,230,463 which is hereby incorporated herein by reference, as well as membranes of polymers as disclosed in U.S. Pats. No. 4,472,175; 4,631,128; 4,632,756; 4,414,368; 4,319.506; 4,351,092; 4,267,630; 4,207,192; 4,210,536; 3,871,950; 3,871,802; and the like, the disclosures of which are hereby incorporated herein by reference. Preferred membranes of cellulose acetate, polysulfone, polyimides and the like are particularly suitable Membranes which can be used in the practice of the invention have a water-to-nitrogen selectivity of about 100 or greater, preferably about 125 or more, most preferably about 250 or more. At nitrogen-to-water selectivities of 125 or greater, the invention reduces the power of the cycle below that of a similar low temperature processing unit using refrigeration to predry the feed stream before introducing it to the molecular sieve predryer. Membranes with lower water to nitrogen selectivities can be used in the invention, however, the additional nitrogen loss through the membrane requires that additional air be fed through the feed air compressor to maintain the same product nitrogen flow. This additional feed flow with its resultant power draw will increase the power to a level above that of the base case as depicted in FIG. 1.

Figure 3:
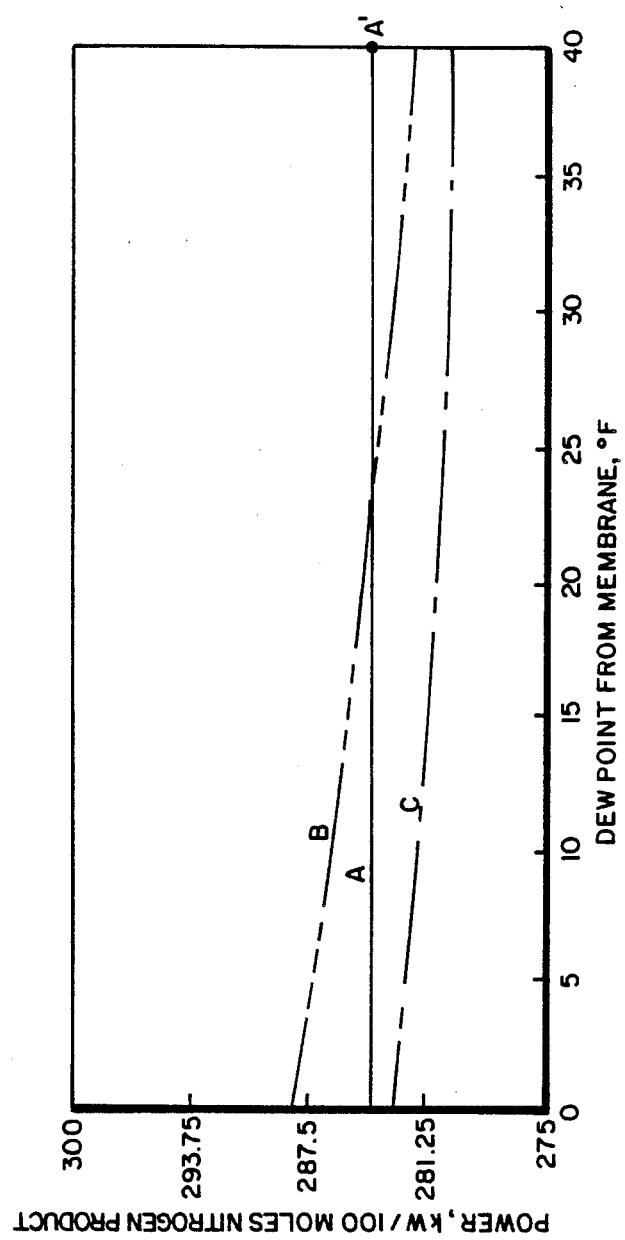
FIG. 3 shows graphically that significant power savings are realized when nitrogen is produced using membranes with water-to-nitrogen selectivities of 125 and 250 compared to refrigeration pretreatment.

FIG. 3 illustrates the effect of water to nitrogen selectivity on the power requirements of the invention as depicted in FIG. 2 compared to the base case as depicted in FIG. 1. Curve A illustrates the power requirements per 100 moles nitrogen product for the base case as depicted in FIG. 1. While the curve traverses the entire width of the graph, in actuality since the refrigeration unit produces a gas with a 40° dewpoint, this is an extension of point A' shown for comparative purposes only. Curve B shows the power requirements of the invention for a membrane with a water to nitrogen selectivity of 125. When the membrane is used to reduce the water content in the feed to the molecular sieve drier to a dewpoint between 25° and 40° F., the energy required to produce 100 moles of nitrogen is reduced to less than that consumed by the base case refrigeration system process. Curve C represents the same process with a membrane exhibiting a water to nitrogen selectivity of 250. In this case, the superiority of the invention extends to dewpoints as low as 0° F. It will be recognized by one skilled in the art that reducing the dewpoint of the feed to the molecular sieve drier has advantages beyond the energy reduction exhibited in FIG. 3. Among these are a reduction in the size of the molecular sieve drier due to the lower water content of the gas being fed to it and a resultant reduction in the amount of regeneration gas flow.

In addition to air separation facilities, the advantages of the invention can be realized for any cryogenic process in which a selectivity of 100 or more exists between water and the desired product and where there is a low pressure purge or fuel stream available from a coldbox.

Although the invention has been described in considerable detail in the foregoing, it is to be understood that such detail is solely for the purpose of illustration. Variations can be made by those skilled in the art without departing from the spirit and scope of the invention except as set forth in the claims.

What is claimed is:

1. A process for separating and recovering a product component from a feed gas mixture containing at least one other component and water, said process comprising: bringing said feed gas mixture into contact with a membrane having a water to product component selectivity of at least 100 to initially remove a portion of the water from the feed gas mixture to produce a partially dried gas stream, feeding the partially dried gas stream through a molecular sieve to remove remaining water to produce dry gas stream, supplying a dry gas stream to a low temperature separation unit to separate the product component from the dry gas stream, and subsequently recovering the product component.

2. The process of claim 1 wherein the product component is nitrogen.

3. The process of claim 2 wherein the membrane also separates carbon dioxide from the gas stream.

4. The process of claim 2 wherein the membrane has a water-to-nitrogen selectivity of at least about 125.

5. The process of claim 4 wherein the membrane has a water-to-nitrogen selectivity of at least about 250.

6. The process of claim 2 which comprises compressing the gas stream from which the nitrogen has been separated and feeding the compressed gas stream back to the membrane as a sweep stream.

7. The process of claim 2 which comprises compressing the gas stream from which the nitrogen has been separated, dividing it into two parts, feeding one part to the membrane as a sweep stream and feeding the other part to the molecular sieve to regenerate it.

8. The process of claim 1 wherein the membrane is cellulose acetate.

9. The process of claim 1 wherein the membrane is a polysulfone.

10. The process of claim 1 wherein the membrane is a polyimide.

11. The process of claim 1 wherein the membrane is a polytrimethylsilylpropyne.

12. The process of claim 1 wherein the membrane is a polytrimethylgermylpropyne.

13. The process of claim 1 wherein the membrane is a multicomponent gas separation membrane.

* * * * *